United States Patent
Bhargava et al.

(10) Patent No.: US 7,653,742 B1
(45) Date of Patent: Jan. 26, 2010

(54) DEFINING AND DETECTING NETWORK APPLICATION BUSINESS ACTIVITIES

(75) Inventors: Sunil Bhargava, Hillborough, CA (US); Sudheer Thakur, Foster City, CA (US)

(73) Assignee: Entrust, Inc., Ottawa, ON (CA)

( * ) Notice: Subject to any disclaimer, the term of this patent is extended or adjusted under 35 U.S.C. 154(b) by 975 days.

(21) Appl. No.: 10/952,599

(22) Filed: Sep. 28, 2004

(51) Int. Cl.
 *G06F 15/173* (2006.01)
(52) U.S. Cl. .................. 709/240; 709/224; 709/225; 709/229; 713/164; 713/165
(58) Field of Classification Search .......... 709/224, 709/225, 229, 240; 713/164, 165; 726/2, 726/6, 23
 See application file for complete search history.

(56) References Cited

U.S. PATENT DOCUMENTS

| 5,720,033 | A | * | 2/1998 | Deo ............................. 726/2 |
| 6,157,707 | A | | 12/2000 | Baulier et al. |
| 6,163,604 | A | | 12/2000 | Baulier et al. |
| 6,178,511 | B1 | * | 1/2001 | Cohen et al. ................. 726/6 |
| 6,279,113 | B1 | * | 8/2001 | Vaidya ........................ 726/23 |
| 6,327,677 | B1 | | 12/2001 | Garg et al. |
| 6,363,411 | B1 | | 3/2002 | Dugan et al. |
| 6,647,400 | B1 | | 11/2003 | Moran |
| 6,965,868 | B1 | | 11/2005 | Bednarek |
| 7,032,114 | B1 | | 4/2006 | Moran |
| 7,065,657 | B1 | | 6/2006 | Moran |
| 7,107,285 | B2 | | 9/2006 | Von Kaenel et al. |
| 7,379,882 | B2 | | 5/2008 | Adams et al. |
| 2002/0038228 | A1 | | 3/2002 | Waldorf et al. |
| 2004/0117358 | A1 | | 6/2004 | Von Kaenel et al. |

FOREIGN PATENT DOCUMENTS

EP  001408439 A1  4/2004

* cited by examiner

*Primary Examiner*—Yves Dalencourt
(74) *Attorney, Agent, or Firm*—Hickman Palermo Truong & Becker LLP

(57) ABSTRACT

Network applications are monitored by defining and detecting activities associated with the applications. Such activities are referred to as "business activities" in the sense that the activities are performed in the process of conducting business using applications. Each business activity of interest is associated with a unique "business signature" which can be used to identify the activity from streams or collections of information. In one embodiment, each business signature of interest to a business is defined as a set of one or more parameter name-value pairs. Once defined, network traffic to and from an application is monitored to detect business signatures, to detect that a corresponding business activity was started. Detecting an activity is based on real-time matching of business signature character patterns within a stream of characters with a repository of character patterns that each represents a business signature defined for the application.

54 Claims, 3 Drawing Sheets

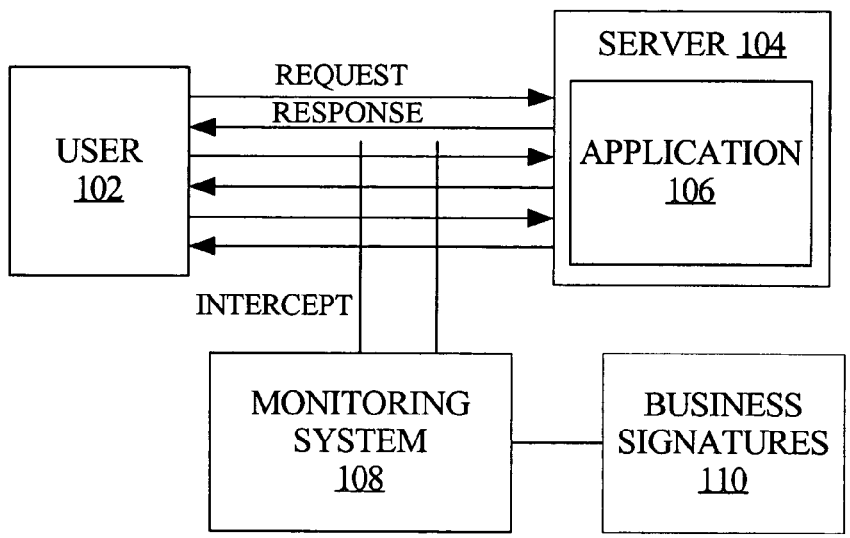

*FIG. 1*

ESTABLISH A SET OF RULES IN WHICH EACH RULE ASSOCIATES A BUSINESS SIGNATURE WITH A BUSINESS ACTIVITY INVOLVING INTERACTION BETWEEN THE APPLICATION AND A USER
202

MONITOR INFORMATION THAT IS GENERATED BASED ON USERS' USE OF THE APPLICATION
204

COMPARE THE INFORMATION AGAINST AT LEAST A PORTION OF THE BUSINESS SIGNATURES IN THE SET OF RULES TO DETERMINE WHICH BUSINESS ACTIVITIES, IF ANY, HAVE BEEN INITIATED
206

*FIG. 2*

DEFINING AND DETECTING NETWORK APPLICATION BUSINESS ACTIVITIES

FIELD OF THE INVENTION

The present invention relates generally to applications that are accessible over communications networks and, more specifically, to monitoring activities associated with network applications.

BACKGROUND

More and more software applications are being developed and deployed in communications networks to conduct business and other activities. These "network applications" are typically installed on some form of computing hardware connected to a network, such as application servers on the Internet. Such application servers provide a platform for deploying, executing, and managing sessions with the applications throughout the applications' life cycles. Once deployed, users can initiate client-server sessions with the applications whereby the users and applications communicate over the network to conduct some type of activity offered by the application.

Often, such activities are performed in the context of conducting some type of business between the users and the applications' owners. An application owner will be referred to herein simply as a "business." The types of business activities that can be conducted between users (whether human or other applications) and network applications are practically limitless. Network applications can be developed to perform a few relatively simple business activities or many very complex, multi-threaded business activities. Application users may be internal to a business, such as employees using an enterprise application, or external to the business, such as a customer or a partner of a business.

Regardless of the nature of the activity for which network applications are developed, the businesses deploying such applications are often concerned with many parameters associated with the activities being conducted via their applications. Such parameters may indicate information such as how, when, where and by whom their applications are being used, how their applications are performing, how the network infrastructure to which their applications are connected are performing, and the like. In light of the vast variations in network applications, in the types of business conducted via the applications, and in the types of activities performed with the applications, there is a widespread need for a tool for monitoring network applications.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of an operating environment in which an embodiment may be implemented;

FIG. 2 is a flow diagram that illustrates a method for monitoring use of a software application, according to an embodiment of the invention;

DETAILED DESCRIPTION OF EMBODIMENTS OF THE INVENTION

Figure 3:
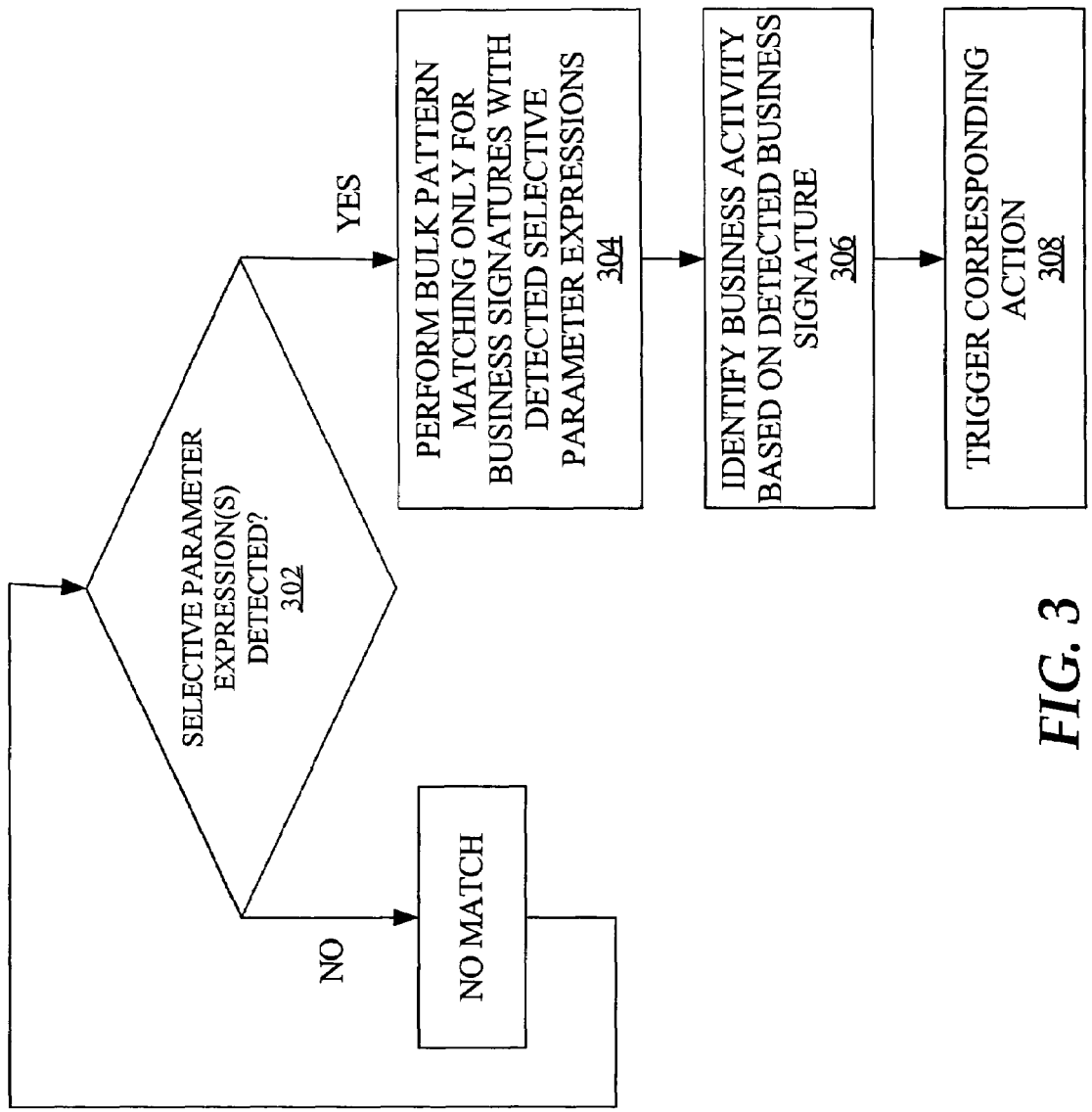
FIG. 3 is a flow diagram that illustrates a process for detecting business signatures in monitored information, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques are described herein for monitoring network applications (hereafter "applications") by defining and detecting, generally, activities associated with, or tasks performed by, applications. Such activities and tasks are referred to herein as "business activities" in the sense that the activities are performed in the process of conducting business using applications. Business activities may be embodied in features provided or processes enabled by an application, such as "login" or "transfer funds." Each business activity of interest is associated with a unique "business signature" which can be used to identify the activity from streams or collections of monitored information. For example, a "login" business activity can be identified in an HTTP message between an application and a user by detecting, in the HTTP message, the business signature corresponding to the activity.

In one embodiment, for an application, each business signature of interest to a business is defined as a set of one or more conjunctive "parameter expressions." Parameter expressions may be, for example, parameter name-value pairs. For example, in the business signature for a "login" activity, the name value pairs represent what information is required to initiate the login process, such as "username=*" and "password=*". Once business signatures have been defined, network traffic to and from an application is monitored to detect instances of the business signatures in the traffic by matching information in the traffic with a repository of defined business signatures, thereby verifying that a corresponding business activity has occurred, or at least initiated. In one embodiment, verifying that such an activity has been initiated is based on real-time matching of (1) patterns within a stream of characters (such as within network traffic to and from the application) with (2) character patterns representing business signatures. Each character pattern represents a business signature defined for the application. Optimization techniques are employed to optimize the business signature matching process, making the matching process fast and efficient.

Through the detection and monitoring, over time, of business activities associated with an application, models or "rhythms" of use and behavior of the application can be recognized, as can variances from such models.

Operating Environment

FIG. 1 is a block diagram of a simple operating environment in which an embodiment may be implemented. The operating environment of FIG. 1 illustrates one of many possible environments in which the techniques described herein may be implemented.

Referring to FIG. 1, a user 102 communicates with an application 106 executing on a server 104, such as an application server, via a network. The communications between the user 102 and the application 104 are depicted as a series of request and response messages. A monitoring system 108 intercepts the messages and analyzes them to detect the presence of instances of predefined business signatures 110. If instances of business signatures are detected in the messages, corresponding business activities of interest to the application owner are identified.

A form in which business signatures 110 are defined, how business signatures 110 are processed and represented for use in efficient real-time matching with monitored information, and how monitored information is processed and compared to a repository of predefined business signatures 110 to detect instances of business signatures in the monitored information, are all described in more detail herein.

Business Activities and Corresponding Business Signatures

Activities associated with applications, and tasks performed by applications or with applications, are generally referred to herein as "business activities" in the sense that the activities are performed in the process of conducting business using network applications. Many business activities with network applications involve multiple underlying components or interactions with the application which, collectively, can be associated with a unique "business signature." Business activities manifest in many forms, for non-limiting examples, (a) as a series of one or more steps in a business process; (b) as events or alarms issued by a network application, network management system or network component; (c) as application states or changes in state; (d) as states, or changes in state, of network infrastructure or computer hardware parameters, such as response time and CPU usage, respectively; and the like. In other words, a business signature can be associated with anything relating to interaction with a network application, in which the application owner (a business) is interested in observing.

A business signatures characterizes a corresponding business activity so that an occurrence of the activity can be detected and verified in real-time, i.e., substantially concurrent with the occurrence of the activity. In that sense, a business signature is a verifiable means for identifying a corresponding business activity.

Defining Business Activities

Business activities can be decomposed into one or more steps of a business process, with each step comprising one or more components, with each component being a smallest unit of information exchanged between an end user and an application. Hence, components contribute to the business signature of a corresponding activity. For example, a business activity with a banking application may be "transfer funds". The "transfer funds" business activity involves steps or interactions performed in one or both directions of communication, from user to application and/or from application to user. The "transfer funds" activity may include a step performed by a user and a step performed by the application. The step performed by the user may include components that can be represented as parameter name-value pairs, such as "username=x" and "password=y", where "x" represents the user's actual user name and "y" represents the user's password.

Business activities may be defined in a number of ways. For example, "transfer funds" could be considered a business activity of interest, or constituent interactions involved in the funds transfer process could be considered the business activity of interest. Further to the example, a "transfer funds-user" activity may be defined to consist of the following components: (a) identify "From" account; (b) identify amount of funds to transfer; and (c) identify "To" account. These components collectively capture the user's contribution to an electronic funds transfer process. Similarly, a "transfer funds-institution" activity may consist of the following components: (d) effect fund transfer; and (e) confirm fund transfer. These components collectively capture the institution's contribution to the electronic funds transfer process. Each one-way process, "transfer funds-user" and "transfer funds-institution", can be associated with a unique business signature that characterizes and represents the steps performed in initiating the corresponding one-way activity. Alternatively, the two-way process, "transfer funds", can be collectively associated with a unique business signature that characterizes and represents the steps performed in a corresponding two-way activity.

Once a set of business signatures is defined for activities of interest for a particular network application, the signatures are stored and later accessed and used to identify the occurrence of a corresponding activity from some form of monitored information. A system described herein for defining business signatures and detecting business signatures in monitored information is referred to herein as a "business signature monitoring system" or simply, a "monitoring system." Sources, attributes and dimensions of business signatures are described hereafter, as are advanced business signatures.

Detecting Business Signatures

Business signatures can be detected in a number of sources of information, through a number of mechanisms. For example, detection mechanisms include (a) interception; (b) injection; and (c) polled.

Intercepted information is intercepted from an interaction or communication between the application and an application user. The information may be intercepted "on the wire," such as with an interception component plugged into a network hardware component. The information may be intercepted at arrival at the application, such as with a sniffer at the application or web server on which the application is executing, where the sniffer intercepts an incoming communication and diverts a copy to the monitoring system for identifying business signatures corresponding to activities of interest.

The types of information that are intercepted may vary from implementation to implementation. For non-limiting examples, HTTP (Hypertext Transfer Protocol), SMTP (Simple Mail Transfer Protocol), SNMP (Simple Network Management Protocol) and/or OLTP (Online Transaction Processing) communications between the application being monitored and application users may be intercepted to identify business activities therefrom. Furthermore, either the header, payload, or both the header and the payload may be analyzed and used to identify business activities.

Injected information is injected or "pushed" into the monitoring system. The application being monitored, or some other application, script or routine, may inject events into the monitoring system. For example, an SNMP event may be injected into the monitoring system when a CPU load exceeds a threshold. For another example, the monitoring system can subscribe to a publisher/subscriber system in order to obtain information for identifying business signatures corresponding to activities of interest.

Polled information is "pulled" into the monitoring system. For example, a log file generated by the application may be polled to identify business signatures corresponding to activities of interest.

Attributes of Interest Regarding Business Activities

The business activities that are represented by business signatures can be associated with a number of attributes of interest. For non-limiting examples, attributes of interest regarding a business activity may be whether or not the activity completed successfully or a fault occurred; how many times the activity occurred in a given period; and/or the performance associated with the activity, such as the response time for the activity. By monitoring exchanges between a user and an application (such as with monitoring system 108 of FIG. 1), and verifying the presence of business activities based on detecting the business signatures that correspond to these business activities, further analysis can be performed to determine whether any attributes of interest regarding the business activities have occurred.

Faults may be detected through numerous means, which may vary from implementation to implementation. For non-limiting examples, a fault with an activity may be detected via an error code issued in response to the fault; via some particular text in a request message or a response message; via the time it takes to receive a request message or a response message; whether or not a response message is received in response to a request message; the size of the header or payload of a request message or response message; and the like. Another example of determining whether attributes of interest have occurred regarding a business activity include monitoring and compiling the occurrence of the business activity over time, perhaps in conjunction with monitoring of system resources, to analyze the business activity's frequency, duration, time of occurrence, and the like. This analysis may then be compared to pre-defined thresholds, recorded, reported, etc.

The business activities that are represented by business signatures may be associated with additional information that is of interest to the business, and which is extractable from the monitored information. For non-limiting examples, business activities may be associated with information regarding the time of the activity; the geographic location from which the activity was initiated; the type of customer that initiated the activity; the referring source of the activity; the destination of a message embodying the activity; and the like. Hence, further analysis can be performed on the monitored information to analyze, to react in response to, and/or to report interesting information associated with business activities. The manners in which detections of business activities are used to further business objectives is virtually limitless, are user-definable and, therefore, may vary from implementation to implementation.

Generally, observation of an activity is used to trigger execution of some action or policy. For non-limiting examples, observation and confirmation of an activity via the activity's business signature may trigger display of a message; transmission of an e-mail; execution of a routine; collection, compilation and/or analysis of some data; and the like. What kind of action is triggered when an activity is observed is virtually limitless, and may vary from implementation to implementation. The manner in which actions are triggered in response to identification of an activity may also vary from implementation to implementation, and conventional techniques may be used.

Method for Monitoring Use of an Application

FIG. 2 is a flow diagram that illustrates a method for monitoring use of a software application, according to an embodiment of the invention. At block 202, a set of rules is established in which each rule associates a business signature with a business activity involving an interaction between the application and a user. In one embodiment, at least one rule further associates an action to perform in response to detecting a particular business activity based on its business signature. For example, a policy can be associated with a business activity which, when the activity is detected, the policy triggers performance of an action, such as execution of a routine.

Establish Business Signatures (I) Identify Unique Information for Use in a Business Signature Before a monitoring system can monitor business activities associated with an application, business activities of interest need to be identified and corresponding business signatures captured and constructed according to a particular construct. In one embodiment, business signatures are captured and constructed via a process in which (1) the underlying business activities are performed by interacting with the application, (2) communications associated with the activities, such as HTTP messages, are intercepted for analysis; (3) portions of the communications that uniquely identify a corresponding business activity are identified, (4) a unique business signature for each corresponding business activity is constructed based on these portions of the communications, as described hereafter, and (5) the business signatures are stored in a repository, such as a database, for later use in detecting corresponding business activities.

In one embodiment, in the process of capturing business signatures for an application, each interaction with the application is defined as a request and an associated response. Request communications associated with particular business activities are compared to request communications associated with other business activities in order to analyze the communications for distinguishing features. Certain information that is found to be distinct among various business activity communications, and therefore unique to a given activity, is identified for use in a corresponding business signature.

(II) Construct a Business Signature Based on the Unique Information

In one embodiment, each business signature comprises one or more parameter expressions, each of which must be present for a corresponding business activity to occur. In one embodiment, parameter expressions are name-value pairs. In one embodiment, one of the parameter expressions from the set of parameter expressions involves the address for information that is transmitted while performing the corresponding business activity, such as the network address (e.g., URL) of the application component that receives the communications from which the business activity is detected. For example, for a "login" activity, the address used in the business signature identifies the network address of the application component that receives a username and password, and the name value pairs represent what information is required to initiate the login process, such as "username=*" and "password=*".

In one embodiment, values for the parameter expressions may be in a literal form, a wildcard form, a disjunctive form (e.g. "in" form), or an inclusive "between" form (e.g., 90<=value<=100). Literal parameter values describe a single type of signature. All other forms of parameter values, when expanded in terms of literal parameter values, describe a set of signatures. A signature consisting of all literal parameter values is referred to herein as a "concrete signature." A signature that includes at least one non-literal parameter value is referred to herein as a "template signature."

Template signatures benefit the user by providing a shorthand mechanism for specifying a signature for what otherwise would have been possible only through a large number of concrete signatures. In addition, template signatures are beneficial because businesses are not always aware of all the different signatures their own system supports. For example, consider an online business with a parameter name of 'state'. The business may be interested in tracking traffic at each individual state level but does not know all the states from which users login. Hence, by comparing a template signature of type 'state=*' with the monitored information (e.g., incoming message traffic) and collecting the matched instances of the template signature, the business can discover and generate all resulting concrete signatures like, state=CA, state=OR, etc.

Constraining business signatures to a set of conjunctive parameter expressions provides performance advantages when attempting to match business signatures with some collection of information, as described hereafter. The parameter expressions selected for use in a business signature are selected as part of a system set-up operation for an application, and from the communications associated with the corresponding business activities. Selection of the parameter expressions for a given business signature is based on the uniqueness of the parameter expressions among all of the business signatures for an application, i.e., the ability of the parameter expressions to distinguish, from a given collection of information, the presence of one business activity from other business activities.

In one embodiment, signatures are constructed using the parameter names that appear in monitored traffic between the application and a user. Typically, the parameter names used by the application reflect the essence of business actions. A user picks the parameter names for a signature based on how uniquely the parameter names identify a given business action. A business signature, however, is not restricted to parameter names used by the application being monitored.

Users (or businesses) can add other parameter names (to be ignored by the backend application) to the message traffic as annotations, which provide extra information about the business interaction. The annotation parameter names can be specified in business signatures, identified in the traffic, and interpreted by the system, thereby providing valuable additional information about the actual business interaction, with or without affecting the determination of whether or not the business signature is detected in the monitored information. For example, annotation parameters are widely used by advertisers to track their online promotions. Therefore, a promotion code that is annotated to the message traffic by a user can be used to provide additional information about a particular business activity or to contribute to detection of the occurrence of the particular business activity in the message.

Use of multiple parameter expressions conjunctively in business signatures simplifies the management of signatures by allowing users to easily generalize or specialize signatures. For example, sig2=PE1 & PE2 (where "sig" represents a business signature and "PE" represents a parameter expression) is a generalization of sig3=PE1 & PE2 & PE3, and sig4=PE1 & PE2 & PE3 & PE4 is a specialization of sig3. For an example of a use, a user can construct "add_to_cart as a base signature, and the user can specialize "add_to_cart" to "add_to_cart_server1", "add_to_cart_server2", etc., if needed. The monitoring system maintains a hierarchy of signatures based on the constituent parameter expressions and reflecting the inherent specializations and/or generalizations.

Language for Defining Business Signatures

One non-limiting example of a language and format that can be used to implement the described business signature construct, is as follows:

```
<signature> ::= <paramExpr> (& <paramExpr>)*
    <paramExpr> ::= <paramName>=<paramValue>;
    <paramValue> ::= literal (|literal)*
        ::= matches(reg-ex)
        ::= inclusive-between(low, high)
    <paramName> ::= <system> | <non-system>
    <system> ::= httpMethod | ipAddr | port | servicePath
    <non-system> ::= <query> | <cookie> | <path>
    <query> ::= literal
    <cookie> ::= literal
    <path> ::= literal
```

The language and format used to define business signatures may vary from implementation to implementation and, therefore, may be in a language and/or format other than foregoing form.

Monitoring Information to Detect Business Signatures

At block 204, information is monitored that is generated based on users' use of the application. As mentioned, information from which the occurrence of business activities is detected may take a number of forms, such as messages according to HTTP or some other network protocol, events or alarms, log files, and the like. Further, such information may be collected using a number of probe types, such as (a) interception; (b) injection; and (c) polled.

Detect Business Activities by Detecting Business Signatures

At block 206, the information that is being monitored at block 204 is compared with at least a portion of the business signatures in the set of rules established at block 202, to determine which business activities, if any, have occurred or have been initiated. Because an activity may fail after initiation of an attempt to perform the activity, detecting a business signature in the monitored information does not necessarily mean that the corresponding business activity completed successfully. For example, the monitoring system may detect in a request message the business signature that corresponds to a "login" activity, however, the login activity may fail for any number of reasons. Failure of, or a fault with, a business activity may be a separate business activity in and of itself. For example, failure of the "login" activity to complete successfully may be detected by detecting, in a response message or an error event, for example, a business signature that corresponds to a "login failed" activity.

In one embodiment, the business signatures are constructed in the conjunctive parameter expression form described herein, and the information that is monitored at block 204 is one or more streams of characters transmitted between respective one or more users and the application. For example, the information against which the business signatures are compared at block 206 may be HTTP messages between the user and the application. In this embodiment, at block 206, a business activity may be detected by detecting, in one of the streams, the parameter expressions from the corresponding business signature.

Optimizations for the Comparison Process

In addition to the construction of the business signatures, a number of optimization techniques are beneficial when used in the process of real-time matching of pre-defined business signatures from a data repository with some form of input information. Two available optimizations are generally referred to herein as (1) parameter expression selectivity and (2) bulk pattern matching processing, each of which is described further herein.

(I) Parameter Expression Selectivity

Once a set of business signatures for monitoring an application is constructed in the conjunctive parameter expression form, the set is analyzed to identify relatively selective parameter expressions. Selective parameter expressions are associated with the signatures they represent. Selective parameter expressions are chosen from the set of all parameter expressions that are associated with business signatures for an application, such that every business signature is associated with at least one selective parameter expression. In one embodiment, selective parameter expressions are chosen such that every business signature is associated with only one selective parameter expression. Selective parameter expressions are used at a first stage of comparison processing, and the associated signatures are selected for a second stage of comparison processing in cases in which there is a match for a selective parameter expression at the first stage. This significantly narrows the search domain of possible matching business signatures for the second stage of comparison processing.

Selective parameter expressions can be determined either statically or dynamically. Statically-determined selective parameter expressions are, generally, those parameter expressions that are included in fewer business signatures (when counted among all business signatures in the monitoring system) than are non-selective parameter expressions. Hence, when a statically-determined selective parameter expression is matched with incoming information, fewer business signatures (i.e., the business signatures that include the matched selective parameter expression) will become possible candidates for further processing. Furthermore, dynamically-determined selective parameter expressions are, generally, those parameter expressions that are found in fewer instances of monitored information than are non-selective parameter expressions. Hence, a dynamically-determined selective parameter expression is less likely to match with incoming information and, therefore, serves the purpose of selecting fewer business signatures as possible matching business signatures.

First detecting information that matches selective parameter expressions in the monitored information facilitates quickly identifying business signatures in the monitored information, by significantly narrowing the search domain of possible matching business signatures to the limited number of business signatures that include the matching selective parameter expressions. Thus, checking for and finding information that matches selective parameter expressions in the monitored information can be used to quickly eliminate, from the search domain of possible signatures, signatures that do not include the selective parameter expressions that were found in the monitored information. Use of the selective parameter expressions to narrow the business signature search domain is described further in reference to FIG. 3.

The selective parameter expressions are used in efficiently comparing incoming monitored information with the set of business signatures, to detect corresponding business activities. Matching individual parameter expressions is a relatively inexpensive computational process, compared to matching complete business signatures. Therefore, in one embodiment, only the selective parameter expressions are used in a first stage of the comparison process to identify business signature possibilities in the incoming monitored information and, therefore, to narrow the scope of the business signature search domain for a second stage of the comparison process.

Because business signatures are constructed in the form of conjunctive parameter expressions, for a positive identification of a business signature in monitored information (e.g., a message), the monitored information must include every parameter expression included in the business signature. However, that does not mean that every parameter expression in the business signature has to be independently compared to every parameter name-value pair in the information to positively determine that the business signature is in the monitored information. For example, in special cases, there might be a selective parameter expression that is included in only one business signature from the set of business signatures. Hence, if that parameter expression is detected in the monitored information, then the group of possible matching business signatures (from the repository) is narrowed to that one business signature. For example, a particular business signature may be defined to include parameter expression A and parameter expression B. However, that business signature may be the only signature from the set of signatures that includes parameter expression B. Hence, the group of possible matching business signatures is narrowed to only that one business signature that includes parameter expression B. Consequently, the comparison process is not required to independently compare parameter expression A to every parameter name-value pair in the collection of information. The process can move directly to the second stage of the comparison process (referred to herein as "bulk pattern matching") to positively determine whether or not the collection of information matches that business signature.

Static Determination of Selective Parameter Expressions

In one embodiment, the process of determining which parameter expressions, from the set of parameter expressions for all the business signatures for an application, are relatively selective, is performed based on the business signature definitions ("static determination"). To statically determine which parameter expressions are relatively selective, the business signature definitions are analyzed to determine, for each parameter expression, which business signatures include the parameter expression. Therefore, the parameter expressions that are more selective than other parameter expressions, in their ability to narrow the search domain of possible business signature matches based on their relative scarcity in a set of business signatures, are readily identified.

Dynamic Determination of Selective Parameter Expressions

In one embodiment, relatively selective parameter expressions are determined, additionally or alternatively to the static determination, based on the incoming monitored information ("dynamic determination"). For information that is found less frequently in the monitored information, the corresponding parameter expressions are relatively more selective than other parameter expressions, in their ability to narrow the search domain of possible business signature matches. If information corresponding to a particular parameter expression is infrequently found in the monitored information, then that particular parameter expression is considered selective. Thus, to dynamically determine selective parameter expressions, the incoming monitored information is analyzed over time, to determine what information that corresponds to parameter expressions appears in the information less frequently than information that corresponds to other parameter expressions. The parameter expressions that correspond to information that appears less frequently are considered selective. Subsequently, the dynamically determined selective parameter expressions can also be used in the first stage of the comparison process to identify business signature possibilities in the incoming monitored information and, therefore, to narrow the search domain of possible matching business signatures for the second stage of the comparison process.

In one embodiment, selective parameter names only (i.e., the parameter name of the parameter expression name-value pair), without the associated value, are determined using the foregoing static and dynamic determination techniques, rather than selective parameter expressions. For example, rather than using "color=grey" as a selective parameter expression, "color" is used as a selective parameter name with no consideration to the associated value.

The threshold established to define a parameter expression or parameter name as selective versus non-selective is configurable and may vary from implementation to implementation. For example, the threshold may be based on the application being monitored, or based on available computational resources, and the like. For example, a certain percentage of the parameter expressions could be described as selective, based on any of a number of factors.

(II) Bulk Pattern Matching Processing

In one embodiment, in preparation for "bulk" pattern matching, the business signatures from the set of business signatures for monitoring an application are normalized. The business signatures are normalized by (1) alphabetically reordering the parameter expressions included in each business signature, and (2) generating a pattern of characters by inserting wildcard characters between adjacent concatenated alphabetically ordered parameter expressions for each business signature. For example, the following parameter expressions, ipAddr=111.111.111.111 and port=80 or 8080, can be converted into a bulk matching pattern of as follows, .*ipAddr=111.111.111.111;.*port=(80|8080).*, for use in matching against alphabetically sorted monitored information. These patterns of characters are stored in a repository for use in bulk pattern matching comparisons against monitored information, such as at block 206 of FIG. 2.

The pattern of characters is processed such that each parameter expression is not searched for separately and independently in the input information. Rather, the parameter expressions are compared in "bulk", by comparing the monitored input information to the patterns of characters configured as described. Comparing business signature parameter expressions in bulk to the monitored information, using the patterns of characters that are constructed to represent the respective business signatures, is a more efficient, quicker and computationally less expensive process than comparing, one at a time, each business signature parameter expression with each parameter from the monitored information. This bulk pattern processing also requires that the parameters in the incoming monitored information be reordered alphabetically, in order to compare them to the normalized business signatures.

Process for Detecting Business Signatures in Monitored Information

FIG. 3 is a flow diagram that illustrates a process for detecting business signatures in monitored information, according to an embodiment of the invention. The process of FIG. 3 could be implemented to perform block 206 of FIG. 2 using the foregoing optimization techniques, and is based on business signatures that are defined according to the conjunctive parameter expression construct.

At block 302, the monitored information (e.g., a message) is analyzed to determine whether or not any instances of the selective parameter expressions or parameter names (both of which are referred to hereafter as "parameter expressions") are detected in the monitored information, by matching elements of the monitored information with pre-identified selective parameter expressions for the application. This analysis is the first stage of the comparison process, and is, in one embodiment, performed on the monitored information in the form in which the monitored information is received, rather than in the alphabetically-ordered parameter name form. In one embodiment, only the selective parameter expressions are compared to the monitored information, at block 302. Thus, any business signatures that do not include any selective parameter expressions that are detected in the monitored information, can be removed from a set of possible matching business signatures.

In special cases, if any selective parameter expressions match the monitored information, then that could be enough to positively detect a business signature. For example, if a selective parameter expression is matched, and that parameter expression is the only parameter expression associated with a business signature, then the business signature itself has been detected. However, this type of case is likely infrequent.

If, at block 302, it is determined that one or more of the selective parameter expressions are detected in the monitored information, then all the business signatures are identified that are associated with these selective parameter expressions that were detected in the monitored information at block 302, producing a reduced set of possible matching business signatures (relative to the set of all business signatures for the application). Then, at block 304, a second stage of processing is performed. In the second stage of processing, the parameters in the monitored information are alphabetized and bulk pattern matching is performed against the reduced set of normalized business signatures, to detect and positively identify the presence of a business signature in the monitored information.

For example, assume the monitored information contains one hundred parameters and the set of business signatures for the application contains one hundred different parameter expressions, ten of which are selective. In comparing an array of the ten selective parameter expressions with the monitored information, at block 302, it is determined that five of the ten selective parameter expressions are matched in the monitored information. All of the business signatures that are associated with the five matched selective parameter expressions are identified for inclusion in the reduced set of possible matching business signatures. The business signatures from the reduced set, in their normalized form, are then bulk matched against the reformatted (e.g., with parameters alphabetized)

monitored information to positively identify the presence of a business signature in the monitored information, at block 304.

Monitored information may embody more than one business activity. Therefore, a given monitored information may match more than one business signature. For example, a message sent from a user to the application may contain parameters indicating that this is the first time that the user has visited the site, which is one business activity, and parameters indicating a login activity, which is a second business activity.

Due to the constraint requiring a conjunctive relation among parameter expressions defined for a business signature, and because the selective parameter expressions are selected such that every business signature contains at least one selective parameter expression, if no selective parameter expressions are detected in the monitored information, then there is no match. Therefore, a business activity is not detected in the monitored information.

In one embodiment, information other than the pre-defined business signatures is used to positively identify the occurrence of a business activity. Therefore, once a business signature is detected in monitored information, an additional step might be to access some other information external to the business signature domain, to correlate with the detected business signature in order to identify a business activity. For example, a business signature may be detected from monitored information, indicating an order for goods using a promotion code. However, the business is really interested in whether there was an order of goods that deserves a discount, the amount of which is based on the promotion code used. Thus, the real business activity of interest is that an order was placed that deserves a 15% discount. Therefore, after detecting a business signature that indicates that an order was placed with promotion code X, the system accesses information external to the business signature domain to determine that an order placed with promotion code X earns a 15% discount and, therefore, a business activity of interest has occurred.

According to an embodiment, a business signature-to-business activity mapping is stored in a data repository. If a business signature is detected from the monitored information, at block 304, then the business signature-to-business activity mapping may be used to identify the business activity that corresponds to the detected signature, at block 306. If a business activity is identified at block 306, then a corresponding action or policy, if any, may be triggered at block 308, via conventional means.

The business signature detection process illustrated in FIG. 3 could continue back to block 302 with different monitored information.

In one embodiment, when a business signature is detected (e.g., the signature is matched in the traffic), the corresponding matching business activity is recorded and certain user-specified attributes from the traffic may be stored, such as the time of the activity; the geographic location from which the activity was initiated; the type of customer that initiated the activity; the referring source of the activity; the destination of a message embodying the activity; and the like. These extra attributes provide contextual information to the recorded business activity, which can be subsequently replayed. Replay involves a process of showing captured business activities in their temporal order at a time later than their actual occurrence.

The process illustrated in FIG. 3 attempts to maximize the results of the first stage (the less computationally expensive stage) based on the selective parameter expressions and, therefore, to minimize the number of business signatures considered at the second stage (the more computationally expensive stage). In a scenario in which the incoming monitored information comes from intercepted messages between a user and the application, the business signature detection process is performed and business activities are identified, in real-time, i.e., substantially concurrent with reception of the monitored information.

Replay Feature

A replay feature can be used, for example, for application diagnostic purposes. Conventional systems with a replay feature typically store the web interactions in their entirety. Recording each and every web interaction slows down the system and generates huge amounts of data. In contrast, in one embodiment, the system described herein records only the matching activities and some related contextual, support information. The resulting data is considerably smaller in size but has enough informational content to allow replay. The process of turning raw traffic into small but meaningful activities and attributes is referred to herein as "semantic compression." In some cases, a complete record may be suitable (e.g., recording traffic in its entirety for fault events). However, in most cases, semantic compression removes data clutter and yields a cleaner record of business interactions.

Hardware Overview

Figure 4:
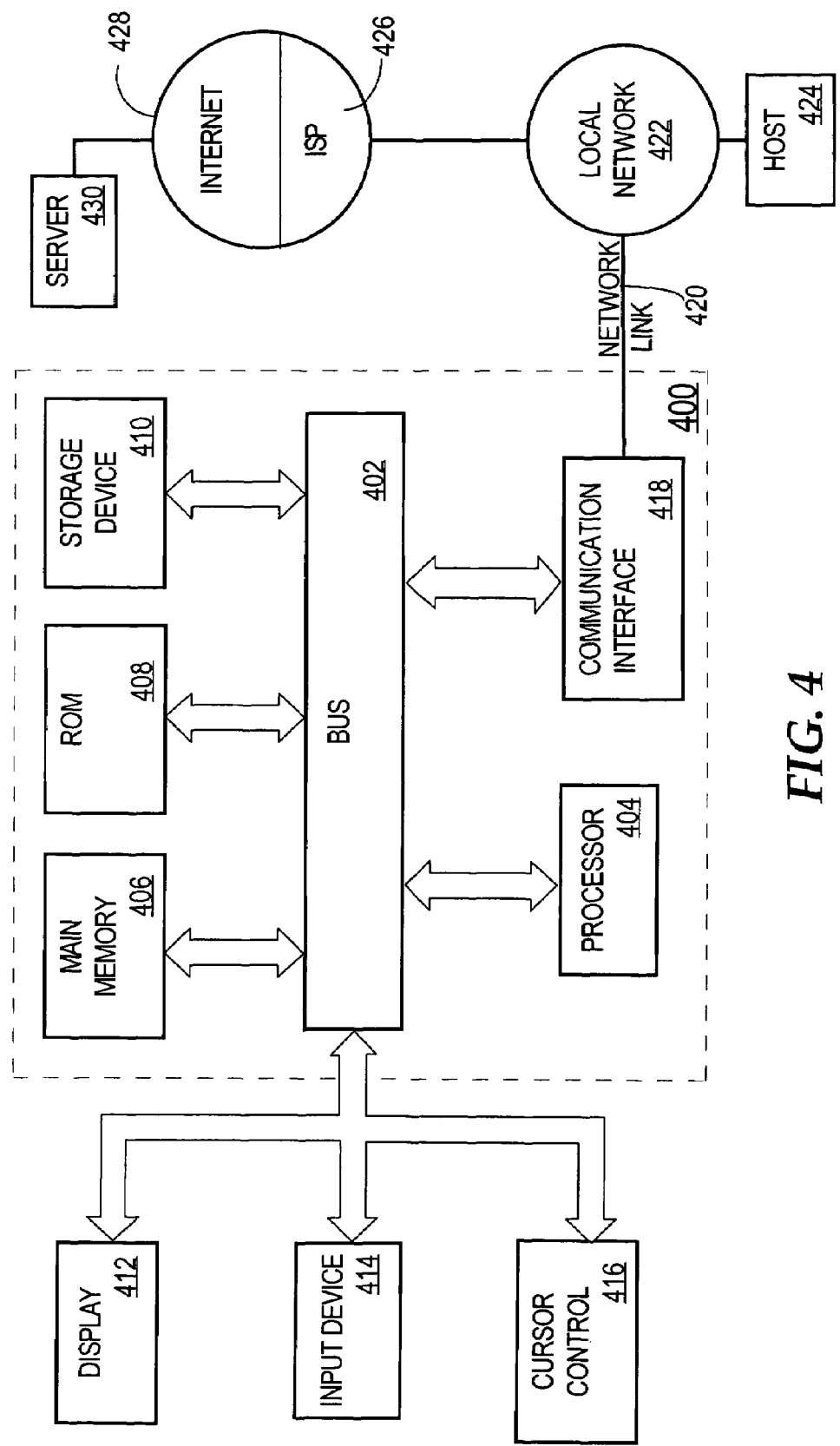
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for detecting activities involving use of a software application, the method comprising the computer-implemented steps of:
establishing a set of rules associating business signatures with business activities, in which each rule comprises an association of one of the business signatures with one of the business activities;
wherein said business activities are each an activity that involves one or more interactions between the application and application users;
wherein the set of rules comprises a rule associating an activity with a signature;
monitoring information that is generated based on at least one user's use of the application;
comparing the information against at least a portion of at least some of the business signatures to determine which of the business activities have been initiated;
based on the comparing, determining that the activity has been initiated;
wherein determining that the activity has been initiated comprises identifying, in said information, a first signature that matches said signature;
wherein identifying the first signature comprises determining that a first set of one or more name-value pairs in a first stream of characters in said information matches the signature;
wherein the signature is a template for the first signature, said template comprising at least one non-literal parameter value capable of matching multiple different values; and
in response to determining that the activity has been initiated, triggering execution of an action or policy associated with the activity;

wherein the method is performed by one or more processors of a computer system.

2. The method of claim 1, wherein
the signature comprises a set of one or more parameter expressions; and
the step of identifying the first signature includes comparing the set of one or more parameter expressions to the first set of one or more name-value pairs.

3. The method of claim 1, wherein the step of comparing is performed substantially concurrent with generation of the information.

4. The method of claim 1, wherein the information that is monitored includes an HTTP (Hypertext Transfer Protocol) message, and wherein the step of comparing includes comparing the HTTP message against at least one of the signatures in the set of rules to determine whether or not a business activity was initiated via the HTTP message.

5. The method of claim 1, wherein the rule indicates that execution of the action or policy is to be triggered in response to determining that the activity was initiated.

6. The method of claim 1, wherein monitoring the information includes intercepting communications between the application and the at least one user.

7. The method of claim 6, wherein intercepting communications comprises intercepting a stream of messages.

8. The method of claim 7, wherein the stream of messages is a stream of HTTP (Hypertext Transfer Protocol) messages.

9. The method of claim 1, wherein monitoring the information includes collecting events emitted by the application.

10. The method of claim 1, wherein monitoring the information includes collecting events emitted by an application or routine other than the application.

11. The method of claim 1, wherein monitoring the information includes accessing log records of activities that are logged by the application.

12. The method of claim 1, wherein at least one of the rules in the set includes a corresponding action to perform in response to determining that a plurality of activities were initiated, the method further comprising the computer-implemented step of:
in response to determining that the plurality of activities were initiated, triggering execution of the corresponding action.

13. The method of claim 1, wherein at least one of the rules in the set includes a corresponding action to perform in response to determining that a plurality of activities were initiated in a sequence, the method further comprising the computer-implemented step of:
in response to determining that the plurality of activities were initiated in the sequence, triggering execution of the corresponding action.

14. The method of claim 1, wherein determining which of the business activities have been initiated, includes
identifying the first signature in the information based on comparing the first set of name-value pairs against at least a portion of the at least some of the business signatures; and
using business activity information that is different than the set of rules, in conjunction with identifying the first signature in the information, to determine that one or more of the business activities, including the activity, have been initiated.

15. A method for detecting activities involving use of a software application, the method comprising the computer-implemented steps of:
establishing a set of rules associating business signatures with business activities, in which each rule comprises an association of one of the business signatures with one of the business activities;
wherein said business activities are each an activity that involves one or more interactions between the application and application users;
wherein the business signatures collectively comprise a set of one or more parameter expressions;
wherein each of the business signatures comprises a subset of the one or more parameter expressions;
analyzing the set of rules to identify a set of selective parameter expressions from the set of parameter expressions and a set of non-selective parameter expressions from the set of parameter expressions, wherein the selective parameter expressions are expressions that are associated with fewer signatures than non-selective parameter expressions;
monitoring information that is generated based on at least one user's use of the application;
comparing the information against at least a portion of at least some of the business signatures in the set of rules to determine which of said business activities have been initiated;
wherein the step of comparing includes performing a first comparison stage by comparing the information against at least one of the selective parameter expressions, without comparing the information against any of the non-selective parameter expressions during the first comparison stage;
based on said comparing, determining that one or more of the business activities has been initiated;
in response to determining that one or more of the business activities has been initiated, triggering execution of one or more actions or one or more policies associated with the one or more of the business activities;
wherein the method is performed by one or more processors of a computer system.

16. The method of claim 15, wherein the step of analyzing the set of rules to identify selective parameter expressions includes identifying the selective parameter expressions such that each business signature comprises at least one selective parameter expression.

17. The method of claim 15, wherein the step of analyzing the set of rules to identify selective parameter expressions includes identifying the selective parameter expressions such that each business signature comprises only one selective parameter expression.

18. The method of claim 15, further comprising the computer-implemented step of:
analyzing the information to identify one or more selective parameter name-value pairs, wherein the selective parameter name-value pairs occur less frequently in the information than non-selective parameter name-value pairs.

19. The method of claim 15, the method further comprising the computer-implemented step of:
for each signature, converting the signature into a pattern of characters;
wherein, for information in which at least one of the selective parameter expressions is detected, the step of comparing includes a second comparison stage of comparing the information against the pattern of characters corresponding to the signatures that include the at least one selective parameter expression.

20. The method of claim 19,
wherein converting each signature comprises alphabetically ordering, within the pattern of characters corresponding to the signature, parameter names from the signature; and
wherein the second comparison stage includes:
alphabetically ordering the parameter names from the information, and
comparing the alphabetically ordered parameter names from the information against the pattern of characters corresponding to at least one of the signatures.

21. The method of claim 20, wherein converting each signature comprises including, in the pattern of characters corresponding to the signature, a wildcard character between alphabetically ordered parameter names from the signature.

22. The method of claim 19, further comprising the computer-implemented step of:
for an activity whose signature is defined to include a parameter name whose corresponding value must be greater than a first value and less than a second value for the activity to occur,
associating a flag with the pattern of characters to indicate that the signature includes a parameter name whose corresponding value must be greater than a first value and less than a second value;
wherein the step of comparing comprises:
identifying the flag associated with the pattern of characters corresponding to the signature for the activity; and
determining, from the information, whether a value for the parameter name is greater than the first value and less than the second value.

23. A method for detecting, in a stream of information that represents an interaction between a software application and a user of the application, business activities conducted using the software application, the method comprising the computer-implemented steps of:
establishing a set of rules associating business signatures with business activities, in which each rule comprises an association of one of the business signatures with one of the business activities;
wherein said business activities are each an activity that involves one or more interactions between the application and application users;
wherein each of the business signatures comprises a set of one or more parameter expressions, wherein each parameter expression in a business signature must be present for the activity associated with that business signature to have occurred;
monitoring at least one stream of information transmitted between the application and a user;
comparing the at least one stream of information against at least a portion of the at least some of the signatures in the set of rules to detect whether any of the business activities have been initiated via the stream;
detecting whether any of the business activities have been initiated based on said comparing, by determining whether a match to at least one of the parameter expressions in the business signatures is included in the at least one stream;
in response to detecting that that an activity has been initiated, detecting whether the activity was completed successfully based on said comparing; and
in response to detecting that performance of the activity that was initiated did not complete, triggering execution of an action or policy associated with a failure to complete the activity; and
wherein the method is performed by one or more processors of a computer system.

24. The method of claim 23, wherein the rule includes a corresponding action to perform in response to determining that performance of the activity did not complete, the method further comprising the computer-implemented step of:
in response to determining that performance of the activity did not complete, triggering execution of the corresponding action.

25. A machine-readable storage medium storing one or more sequences of instructions which, when executed by one or more processors, causes the one or more processors to perform the method recited in claim 1.

26. A machine-readable storage medium storing one or more sequences of instructions which, when executed by one or more processors, causes the one or more processors to perform the method recited in claim 2.

27. A machine-readable storage medium storing one or more sequences of instructions which, when executed by one or more processors, causes the one or more processors to perform the method recited in claim 3.

28. A machine-readable storage medium storing one or more sequences of instructions which, when executed by one or more processors, causes the one or more processors to perform the method recited in claim 4.

29. A machine-readable storage medium storing one or more sequences of instructions which, when executed by one or more processors, causes the one or more processors to perform the method recited in claim 15.

30. A machine-readable storage medium storing one or more sequences of instructions which, when executed by one or more processors, causes the one or more processors to perform the method recited in claim 16.

31. A machine-readable storage medium storing one or more sequences of instructions which, when executed by one or more processors, causes the one or more processors to perform the method recited in claim 17.

32. A machine-readable storage medium storing one or more sequences of instructions which, when executed by one or more processors, causes the one or more processors to perform the method recited in claim 18.

33. A machine-readable storage medium storing one or more sequences of instructions which, when executed by one or more processors, causes the one or more processors to perform the method recited in claim 19.

34. A machine-readable storage medium storing one or more sequences of instructions which, when executed by one or more processors, causes the one or more processors to perform the method recited in claim 20.

35. A machine-readable storage medium storing one or more sequences of instructions which, when executed by one or more processors, causes the one or more processors to perform the method recited in claim 21.

36. A machine-readable storage medium storing one or more sequences of instructions which, when executed by one or more processors, causes the one or more processors to perform the method recited in claim 22.

37. A machine-readable storage medium storing one or more sequences of instructions which, when executed by one or more processors, causes the one or more processors to perform the method recited in claim 5.

38. A machine-readable storage medium storing one or more sequences of instructions which, when executed by one or more processors, causes the one or more processors to perform the method recited in claim 6.

39. A machine-readable storage medium storing one or more sequences of instructions which, when executed by one or more processors, causes the one or more processors to perform the method recited in claim 7.

40. A machine-readable storage medium storing one or more sequences of instructions which, when executed by one or more processors, causes the one or more processors to perform the method recited in claim 8.

41. A machine-readable storage medium storing one or more sequences of instructions which, when executed by one or more processors, causes the one or more processors to perform the method recited in claim 9.

42. A machine-readable storage medium storing one or more sequences of instructions which, when executed by one or more processors, causes the one or more processors to perform the method recited in claim 10.

43. A machine-readable storage medium storing one or more sequences of instructions which, when executed by one or more processors, causes the one or more processors to perform the method recited in claim 11.

44. A machine-readable storage medium storing one or more sequences of instructions which, when executed by one or more processors, causes the one or more processors to perform the method recited in claim 24.

45. A machine-readable storage medium storing one or more sequences of instructions which, when executed by one or more processors, causes the one or more processors to perform the method recited in claim 12.

46. A machine-readable storage medium storing one or more sequences of instructions which, when executed by one or more processors, causes the one or more processors to perform the method recited in claim 13.

47. A machine-readable storage medium storing one or more sequences of instructions which, when executed by one or more processors, causes the one or more processors to perform the method recited in claim 14.

48. A machine-readable storage medium storing one or more sequences of instructions which, when executed by one or more processors, causes the one or more processors to perform the method recited in claim 23.

49. The method of claim 15, wherein:
the step of comparing further includes performing a second comparison stage for a signature, said signature having a selective parameter expression for which a match was found in the information during the first comparison stage;
the second comparison stage comprises determining that the information comprises a match for the signature by performing a comparison based on at least the information and one or more non-selective expressions associated with the signature.

50. A machine-readable storage medium storing one or more sequences of instructions which, when executed by one or more processors, causes the one or more processors to perform the method recited in claim 49.

51. The method of claim 23,
wherein detecting that that the activity has been initiated, comprises matching a first parameter expression in a first signature to the at least one stream;
wherein detecting that that the activity did not complete comprises failing to detect a second parameter expression in a second signature within the at least one stream within a certain period of time;
wherein the first signature and the second signature are both in a sequence of signatures.

52. The method of claim 23,
wherein detecting that that the activity has been initiated, comprises matching a first parameter expression in a first signature to the at least one stream;
wherein detecting that that the activity did not complete comprises detecting a second parameter expression in a second signature within the at least one stream;
wherein the second signature is associated with said failure.

53. A machine-readable storage medium storing one or more sequences of instructions which, when executed by one or more processors, causes the one or more processors to perform the method recited in claim 51.

54. A machine-readable storage medium storing one or more sequences of instructions which, when executed by one or more processors, causes the one or more processors to perform the method recited in claim 52.

* * * * *